Patented Feb. 12, 1935

1,991,109

UNITED STATES PATENT OFFICE 1,991,109

CELLULOSE ESTER MOLDING COMPOSITION CONTAINING A DIACYL DERIVATIVE OF 1:4-DIOXANE

James G. McNally and John J. Schmitt, Rochester, N. Y., assignors to Eastman Kodak Company, Rochester, N. Y., a corporation of New York No Drawing. Application November 18, 1933, Serial No. 698,686

16 Claims. (Cl. 106—40)

This invention relates to compositions of matter in which cellulose esters are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of molding compounds and products, and the like.

One object of this invention is to produce compositions which can be molded at elevated temperatures and high pressures to produce thermoplastic products having the desirable properties of hardness, toughness and elasticity. Another object is to produce molded objects of great hardness and strength. Other objects will become apparent to those skilled in the art to which this invention pertains.

It is known to mold mixtures of cellulose esters and certain plasticizers by subjecting them to heat and pressure. The majority of plasticizers, however, are not suitable for use in such a process. In order to be useful in molding cellulose esters, a plasticizer must be able, when used alone with the cellulose ester, to exert a solvent action on the cellulose ester under heat and pressure, forming with it a homogeneous composition which flows under heat and pressure to take the shape of the mold. Furthermore, in order to be thoroughly satisfactory as a plasticizer for molding cellulose esters, the plasticizer should be capable of forming with the cellulose esters, under heat and pressure, transparent or translucent objects which are hard but not brittle, capable of being machined and polished.

The plasticizers heretofore known for molding cellulose esters, and in particular for molding organic esters of cellulose, such, for instance, as cellulose acetate, cellulose acetate-propionate, etc., when added to the cellulose ester in amounts sufficient to permit the composition to be molded at only moderately elevated temperatures, gave molded products of low tensile strength and low rigidity, which could be too easily deformed or broken by stresses to which they would be subjected in certain uses to which it might be desired to put them.

We have discovered that the diacyl esters of 1:4-dioxanediol may be employed as molding plasticizers for cellulose esters, and that the molded products so produced have high tensile strength and low elongation.

In more particularly describing our invention, we shall speak of cellulose acetate as the cellulose ester employed, but we have found that our novel molding plasticizers also have high utility in molding other cellulose esters, such, for instance, as cellulose nitrate, cellulose nitro-acetate, cellulose propionate, cellulose butyrate, cellulose acetate-propionate, cellulose acetate-butyrate, etc. We shall also speak of dioxanediol diacetate as the diacyl ester of dioxanediol employed, although we have also prepared other diacyl esters of dioxanediol, including dioxanediol diformate dioxanediol, dipropionate, dioxanediol dilactate, dioxanediol dibenzoate, and dioxanediol disalicylate, and have found that they are all useful in the same relationships with cellulose esters as dioxanediol diacetate.

The preparation of dioxanediol diacetate, and the compound itself, have been described by Böeseken, Tellegen and Henriquez in the Journal of the American Chemical Society, vol. 55, pages 1284–8 (1933), where it is designated as the diacetate of dioxane. It is thought to have the structural formula

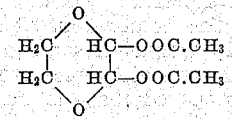

We have prepared the other diacyl esters of dioxanediol by the same method, namely, by heating the anhydrous potassium salt of the corresponding acid with dichlorodioxane in the presence of the corresponding acid itself.

In carrying out our invention, we may mix the molding plasticizer with the cellulose acetate by grinding, or we may dissolve the molding plasticizer in a liquid which is not a solvent for the cellulose acetate, mix the cellulose acetate with the solution, and drive off the liquid by heating, stirring constantly to prevent lumping. Or we may mix the molding plasticizer with the cellulose acetate in any other known manner. Pigments, dyes or other effect materials may be added to the mixture. We then mold the mixture of plasticizer and cellulose acetate in any suitable press, such as a hydraulic press heated by steam, at a temperature of from about 140° to 160° C. or more, and a pressure of from 2500 to 4000 lbs. per square inch, approximately. Furthermore, our novel molding plasticizers may be employed in the dry-molding processes described and claimed in the application of Fred R. Conklin entitled "Molding process", Serial No. 665,258, filed April 10, 1933. They are also suitable for use in the injection molding of cellulose esters. For injection molding it is desirable to use a cellulose ester having a comparatively low viscosity, preferably no higher than 8,000 centipoises in a 20% solution in acetone at 20° C.

As an example of the greatly improved properties induced in cellulose ester molded products by our novel molding plasticizers, we give the results of tests on molded rods made from compositions consisting of 100 parts by weight of cellulose acetate and 40 parts by weight of molding plasticizer. In the one case the molding plasticizer was dimethyl phthalate, a compound very commonly employed as a molding plasticizer for cellulose acetate. In the other case, the molding plasticizer was dioxanediol diacetate. When dimethyl phthalate was used, the tensile strength of the molded rod was 4000 lbs. per square inch, and the elongation of the rod at the breaking point was 15% of its original length, whereas the dioxanediol diacetate was used, the tensile strength of the rod was 12,000 lbs. per square inch, and the elongation at the breaking point was only 1.5% of its original length. Thus, the rod containing dioxanediol diacetate had three times the tensile strength and only one-tenth the elongation of the rod containing the dimethyl phthalate. It was hard, rigid and very strong.

If it is desired to produce molded cellulose ester products of hardness and tensile strength intermediate between those conferred by dioxanediol diacetate and those conferred by another molding plasticizer, this may be accomplished by employing a mixture of the two plasticizers. In this way the mechanical properties of the molded product may be varied within wide limits.

It is possible to produce transparent films or sheets from the cellulose esters and the dioxanediol diacyl esters. For example, we may proceed as follows. 100 parts of acetone-soluble cellulose acetate, i. e., cellulose acetate containing from 36% to 42% acetyl radical, approximately, is dissolved with stirring at atmospheric temperature in 300 to 500 parts, preferably 400 parts, by weight, of acetone. To this solution may be added from 30 to 50 parts by weight of a dioxanediol diacyl ester, such as dioxanediol diacetate. The composition thus prepared may be deposited upon any suitable film-forming surface to form a film or sheet, in a manner well known to those skilled in the art. Such sheets are transparent, but do not have sufficient flexibility to recommend their use as photographic film support, for instance. However, they are thermoplastic, and may be shaped as desired, and are especially useful where a sheet of unusual hardness is desired.

What we claim as our invention and desire to be secured by Letters Patent of the United States is:

1. A composition of matter comprising a cellulose ester and a diacyl ester of dioxanediol.

2. A molding composition adapted for molding under elevated temperatures and high pressures, comprising a cellulose ester and a diacyl ester of dioxanediol.

3. A molded product comprising a cellulose ester and a diacyl ester of dioxanediol.

4. A composition of matter comprising a cellulose organic ester and a diacyl ester of dioxanediol.

5. A molding composition adapted for molding under elevated temperatures and high pressures, comprising a cellulose organic ester and a diacyl ester of dioxanediol.

6. A molded product comprising a cellulose organic ester and a diacyl ester of dioxanediol.

7. A molding composition adapted for molding under elevated temperatures and high pressures, comprising a cellulose organic ester and dioxanediol diacetate.

8. A molded product comprising a cellulose organic ester and dioxanediol diacetate.

9. A molding composition adapted for molding under elevated temperatures and high pressures, comprising cellulose acetate and dioxanediol diacetate.

10. A molded product comprising cellulose acetate and dioxanediol diacetate.

11. A composition of matter comprising cellulose acetate and a diacyl ester of dioxanediol.

12. A molding composition adapted for molding under elevated temperatures and high pressures, comprising cellulose acetate and a diacyl ester of dioxanediol.

13. A molded product comprising cellulose acetate and a diacyl ester of dioxanediol.

14. A composition of matter comprising dioxanediol diacetate and a cellulose ester, the viscosity of the cellulose ester being no greater than 8,000 centipoises in 20% solution in acetone at 20° C.

15. A composition of matter comprising dioxanediol diacetate and a cellulose organic ester, the viscosity of the cellulose organic ester being no greater than 8,000 centipoises in 20% solution in acetone at 20° C.

16. A composition of matter comprising dioxanediol diacetate and cellulose acetate, the viscosity of the cellulose acetate being no greater than 8,000 centipoises in 20% solution in acetone at 20° C.

JAMES G. McNALLY.
JOHN J. SCHMITT.